United States Patent [19]

Kammeraad

[11] Patent Number: 4,502,696
[45] Date of Patent: Mar. 5, 1985

[54] VALVE SEAL RETAINER WITH MULTIPLE DIAMETER BOOT BASE

[75] Inventor: James A. Kammeraad, Holland, Mich.

[73] Assignee: K-Line Industries, Inc., Holland, Mich.

[21] Appl. No.: 627,071

[22] Filed: Jul. 2, 1984

[51] Int. Cl.³ .......................... F16K 41/00; F16J 15/32
[52] U.S. Cl. .......................................... 277/12; 277/5; 277/166; 277/188 R; 277/183; 123/188 P
[58] Field of Search ............... 277/12, 32, 166, 188 R, 277/212 F; 123/188 P

[56] References Cited

U.S. PATENT DOCUMENTS

| | | | |
|---|---|---|---|
| 2,821,973 | 2/1958 | Juhman | 123/188 P |
| 3,531,134 | 9/1970 | Kammeraad | 123/188 P |
| 3,599,992 | 8/1971 | Kammeraad | 277/189 X |

FOREIGN PATENT DOCUMENTS 983024  2/1965  United Kingdom ................ 277/189

Primary Examiner—Robert S. Ward
Attorney, Agent, or Firm—Price, Heneveld, Huizenga & Cooper

[57] ABSTRACT

A valve seal retaining boot has a tubular base with at least two contiguous segments of progressively narrowing diameters. The largest diameter segment is closest to the valve seal, the smallest diameter segment is the furthest from the valve seal. The largest diameter segment can accommodate with an acceptable retention stretch limit a cylinder head exposed shoulder having the largest positive deviation from a nominal diameter. The smallest segment is designed to accommodate with an acceptable retention stretch limit an exposed shoulder with the largest negative deviation from a nominal diameter. Segments of intermediate diameters can be provided to accommodate exposed shoulders with diameters intermediate the maximum positive and negative deviations from the nominal diameter.

7 Claims, 5 Drawing Figures

VALVE SEAL RETAINER WITH MULTIPLE DIAMETER BOOT BASE

BACKGROUND OF THE INVENTION

The present invention relates to valve seals for valves of internal combustion engines and, more particularly, to a valve seal retainer mechanism.

Internal combustion engines typically have a series of reciprocating valves for permitting entry of the combustion mixture into and exhaust of the combustion products out of the cylinders. These valves have valve stems which slidably reciprocate within the valve guides—bores through the cylinder head of the engine. The valves are actuated in proper sequence by means of rocker arms, push rods, cams and the like, which are well known in the art.

There typically is provided a bath of oil surrounding the above components to minimize wear during operation of the engine. In particular, it has been found that a certain amount of oil must be allowed to work its way down between the valve stem and valve guides to keep them lubricated. This prevents excessive wear of these parts. However, it is undesirable to permit excess quantities of oil to work down between the valve stems and guides since the oil will leak into the cylinder, causing excessive oil usage by the engine and poor operating characteristics.

Therefore, valve seals are typically provided which meter the amount of oil permitted between the valve stems and guides. These seals are typically positioned around the valve stems immediately above the valve guides. Some types of such seals are held in place by deformable, metallic retaining boots, such as those illustrated in U.S. Pat. No. 3,531,134, which holds the seals atop the valve guides and which telescopically and deformably engage the exposed shoulder portions of the valve guides.

The telescopic engagement between the retaining boots and the exposed shoulder portions should generally be quite tight to withstand the reciprocating forces exerted by the reciprocating valve stems over a long period of time. It has been found, however, that the retaining boots of the type illustrated in the aforementioned U.S. Pat. No. 3,531,134 will occasionally fail and pull off the exposed shoulder portions, rendering the seal useless and sometimes fouling the valve spring mechanism.

The cause of these failures is primarily attributable to relatively large tolerance ranges allowed during machining of the outside diameters of the exposed shoulders, particularly insofar as original equipment manufacture is concerned, where tolerances of ±0.010-inch are not uncommon. The boots, in other words, must frequently stretch over exposed shoulders with diameters considerably larger than the nominal diameters the boots were designed to fit. The boots must at the same time be capable of engaging shoulders of undersized dimension. The resultant stretching when an oversized shoulder is encountered reduces considerably the force required to pull off such boots.

Because these installation problems have been encountered, the valve seal retaining boots which are the subject of the aforementioned U.S. Pat. No. 3,531,134 have found primary acceptance only in engine rebuilding operations where tolerances are closely controlled. Such boots have not found wide acceptance by engine manufacturers as original equipment because of the noted tolerance problems. This has been the case even though metallic retaining boots of this type, when properly fitted, are far superior to any other currently available retaining boot.

SUMMARY OF THE INVENTION

The valve seal retaining boot of the present invention, an improvement over that disclosed and claimed in the aforementioned U.S. Pat. No. 3,531,134, typically requires substantially more force to pull off an exposed shoulder than the prior art retaining boot. The retaining boot which is the subject of this invention accommodates exposed shoulders with wide diameter tolerance ranges. The retaining boot of the present invention provides, on the whole, a much stronger telescopic engagement between the boot and the exposed shoulder portion, both from a breakaway and pulling standpoint, particularly insofar as original equipment is concerned.

The present invention comprises a deformable, metallic boot which includes a plurality of contiguous stepped segments of progressively increasing diameter from the bottom segment to the top. These contiguous segments are capable of gripping an exposed valve guide shoulder much more firmly than similar structures of the prior art retaining boots, particularly where shoulder tolerances are somewhat loose—conditions encountered primarily in original equipment manufacture.

These advantages and features of the present invention will be more fully understood and appreciated with reference to the written specification and appended drawings.

DESCRIPTION OF THE PREFERRED EMBODIMENT

Figure 1:
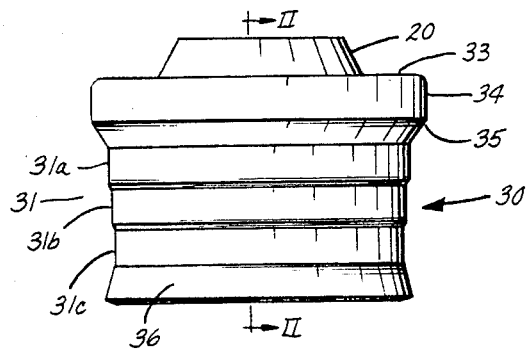
FIG. 1 is a side elevation of a valve seal assembly incorporating the retaining boot of the present invention.
Figure 2:
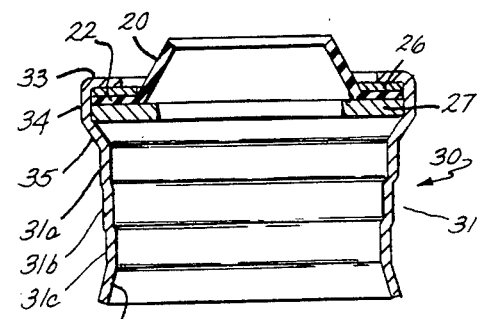
FIG. 2 is a cross-sectional view taken along the plane II—II of FIg. 1.

Referring to FIGS. 1 and 2, the valve seal assembly incorporating the retaining boot of the present invention is illustrated. The assembly consists of valve seal 20 with radially extending portion 22 thereof sandwiched between an upper retaining washer 26 and a lower retaining washer 27. This sandwich is retained in compressive abutment between circumferential shoulder 33 and compression lip 35 in the area of the boot 30, expanded as indicated at 34. The details of the seal assembly are described in U.S. Pat. No. 3,599,992.

Figure 5:
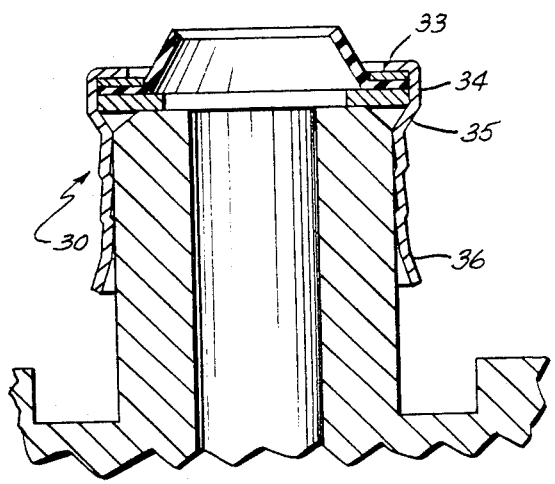
FIG. 5 is a cross-sectional view of an exposed shoulder having an oversized diameter illustrating the telescopic attachment of the retaining boot of the present invention thereto.
Figure 4:
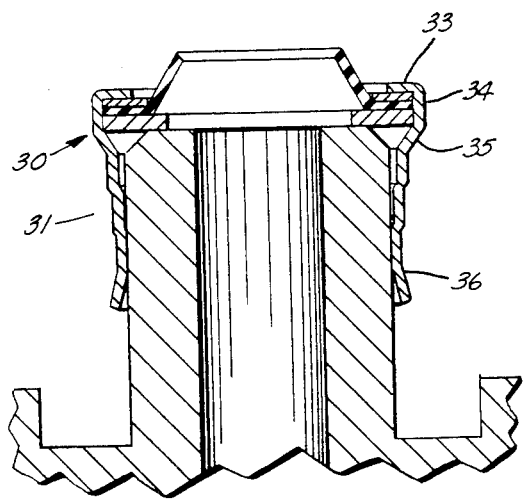
FIG. 4 is a cross-sectional view of an exposed shoulder having an undersized diameter illustrating in cross section the telescopic attachment of the retaining boot of the present invention thereto.
Figure 3:
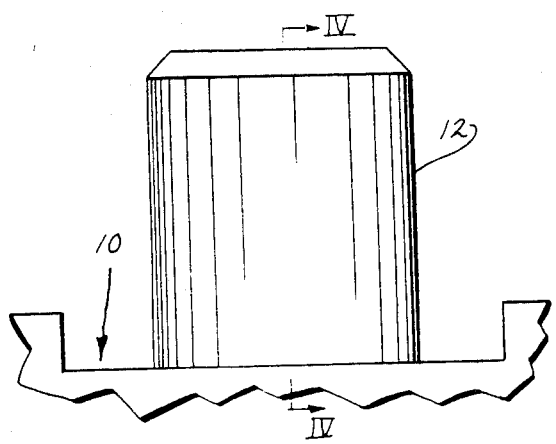
FIG. 3 is a side elevation of an exposed shoulder of a cylinder head valve guide, the exposed shoulder having a substantially circular horizontal cross section and being symmetrical about a central vertical axis.

Valve seal 20 is used merely for illustration. A different type of valve seal could be used consistent with the teachings of this invention. The present invention resides in the tubular base 31 of boot 30. Tubular base 31 includes three contiguous stepped segments 31(a), 31(b) and 31(c) of progressively increasing diameter from the bottom segment to the top. The base 31 also inclues a skirt 36 which facilitates the telescopic insertion of boot 30 over exposed shoulder portion 12 of valve guide 11 of cylinder head 10, as shown in FIGS. 4 and 5. The boot is made from drawing quality steel. The advantages of the multi-stepped arrangement over a tubular base of uniform diameter will become apparent.

Prior art boots of this type—the "straight boot"—are also typically made from drawing quality steel but do not have the multi-stepped arrangement above. Steel, however, affords good strength and good high temperature performance. It has been observed that the diameter of a boot made from 0.015- to 0.020-inch thick drawing qualitly steel may stretch about 0.002- to 0.005-inch when the boot is telescopically inserted onto an exposed shoulder. A boot stretched within the 0.002- to 0.005-inch limit will have the maximum retention on an exposed shoulder and will require the maximum force to remove it from the exposed shoulder. This stretch limit will hereinafter be referred to as the maximum retention stretch limit. It should be apparent that boots made from other metals will exhibit different maximum retention stretch limits.

It has also been found that a boot made from drawing quality steel of about 0.015- to about 0.020-inch will have no retention and is very easily removed if the diameter of the boot is stretched beyond 0.020-inch when the boot is telescopically inserted onto an exposed shoulder. This stretch limit will hereinafter be referred to as the yield limit. It should likewise be apparent that boots made from other metals will exhibit different yield limits.

Between the yield limit and the maximum retention stretch limit is a region of stretch wherein progressively less force is required to pull the boot off the exposed shoulder as the diameter is stretched to sizes between these two limits. It has been found that acceptable retention forces have been achieved when the diameter of boots made from drawn quality steel having a thickness of about 0.015- to about 0.020-inch is stretched no more than about 0.010-inch. This 0.010-inch limit will hereinafter be referred to as the acceptable retention stretch limit. Boots made from other materials will exhibit different acceptable retention stretch limits.

The outside diameters of exposed shoulders of cylinder head valve guides typically range about ±0.010-inch from the nominal diameter. For example, a shoulder 12 with a nominal diameter of 0.562-inch may actually range from 0.552- to 0.572-inch. Therefore, shoulders with the largest diameters will cause a "straight boot" designed for the nominal diameter to stretch beyond the maximum retention stretch limit and almost beyond the acceptable retention stretch limit. The shoulders with the smallest diameters will be too small to permit the boot to stretch at all.

Furthermore, the tolerances of the boot diameters can only typically be maintained within ±0.003-inch. Therefore, a "straight boot" having a diameter of 0.562-inch may well have diameters ranging from 0.559-inch to 0.565-inch. Therefore, a shoulder 12 with a nominal diameter of 0.562-inch and an actual diameter of 0.572-inch will overstretch a "straight boot" with a nominal diameter of 0.562-inch and an actual diameter of 0.559-inch.

The multi-stepped arrangement described above overcomes many of these problems. An example will illustrate this. As previously indicated, an exposed shoulder 12 with a nominal diameter of 0.562-inch may actually have a diameter as large as 0.572-inch or as small as 0.552-inch. A three-stepped retaining boot with a step segment 31(a) having a diameter of about 0.567-inch, step segment 31(b) having a diameter of 0.560-inch and step segment 31(c) having a diameter of 0.551-inch can firmly grip an exposed shoulder with a 0.562±0.010-inch diameter well within the acceptable retention stretch limits of each stepped segment. Step segment 31(a) with a diameter ranging from 0.568- to 0.570-inch will not be stretched very much beyond its 0.005-inch maximum retention stretch limit, and indeed would be within its acceptable retention stretch limit if the diameter of the 0.562-inch exposed shoulder 12 in fact turned out to be 0.572-inch, as illustrated in FIG. 6.

Likewise, if the 0.562-inch diameter exposed shoulder 12 in fact had a 0.552-inch diameter, segment 31(c) with an inside diameter ranging from 0.548- to 0.550-inch would be stretched to its maximum retention stretch limit and would firmly grip such an exposed shoulder, as shown in FIG. 5. Furthermore, segment 31(c) can accommodate within its acceptable stretch limit exposed shoulders having diameters as great as from 0.558- to 0.560-inch.

Segment 31(b) can grip exposed shoulders 12 of many diameters between extremes where segment 31(c) would be stretched too much and segment 31(a) would be too large. For instance, in the above example, segment 31(b) having a diameter ranging from about 0.558- to 0.560-inch can accommodate within its maximum retention stretch limits many of the diameters between the upper limit of the acceptable stretch limit for segment 31(c) and the point where the exposed shoulder portion would have a diameter approximately within the maximum retention stretch limit of segment 31(a).

The results achieved with a multi-stepped retaining boot are remarkable. It has been observed that in pulling a retaining boot from an exposed shoulder 12, an initial break force—usually quite large—is required to loosen the boot from exposed shoulder 12. Once a boot is loosened, a lesser pulling force is required to pull the boot off the exposed shoulder. Table I reports the breaking and pulling forces required to remove various types of boots from exposed shoulders 12 of various diameters and materials. The upper number reported in each box is the breaking force in pounds required to loosen each boot from its respective exposed shoulder 12. The lower number reported in each box is the pulling force required to remove each boot from its respective exposed shoulder 12 after the breaking force has been applied.

The data reported in Table I correspond roughly to the performance of various boots on a valve guide exposed shoulder portion 12 with a nominal diameter of 0.562-inch. As can be seen, the triple-stepped boot of the present invention can accommodate a wider range of exposed shoulder diameters than any other design. The breaking force required to remove the triple-stepped boot from the various sized exposed shoulders is generally equivalent to the breaking force required for boots with no stepped segments. The only possible exception to this is the fold boot—a boot having an annularly, inwardly projecting fold in lieu of skirt 36 of the present retainer boot but not having stepped segments. The fold boot is described in U.S. Pat. No. 3,531,134 and is shown in FIG. 5 of that patent. The fold boot generally requires a greater breaking force, provided that the diameter of the exposed shoulder 12 is within a certain range. When the range is exceeded, for instance, with a 0.569-inch diameter steel exposed shoulder, the breaking force required to remove the fold boot drops dramatically, as indicated in the Table.

In contrast with all of the other boots, the three-stepped segmented boot of the present invention exhibits a broader range of applicability as it can accommodate both a 0.569-inch diameter exposed shoulder as well as a 0.555-inch diameter shoulder. A two-stepped segmented boot has some utility on the tested cylinder heads, although over a narrower range of exposed shoulder diameters, as can be seen in Table 1. It has been found, however, that some original equipment manufacturers as well as businesses engaged in rebuilding operations keep the tolerance range of their cylinder head exposed shoulders within the acceptable retention stretch limits of a two-stepped segmented boot, but not within the acceptable retention stretch limits of a "straight boot." It has been found additionally that the two-stepped segmented boot is superior to a three-stepped segmented boot in these applications.

In the development of the multi-step segmented boot of the present invention, it has been found that the segments must be of progressively narrowing diameters, the largest diameter segment being on the top closest to valve seal 20, the smallest diameter segment being the lowest of the segments, as shown in FIG. 1. With a two-stepped boot, the larger diameter must be on the top closer to valve seal 20.

It is believed that more than three steps can be provided in a multi-stepped boot. Such a boot would be particularly useful if the tolerance range of exposed shoulders 12 were greater than ±0.010-inch. However, a three-stepped boot has been found to have remarkable utility on exposed shoulders with ±0.010-inch diameter tolerance ranges.

From the foregoing, it should be apparent that a retaining boot can be designed according to the teachings of the present invention to fit any valve guide exposed shoulder of a given nominal diameter provided at least one of the plurality of stepped segments of said retaining boot can accommodate within its acceptable retention stretch limit the exposed shoulder with the largest positive deviation from the nominal diameter and at least one of a plurality of stepped segments can accommodate within its acceptable retention stretch limit the exposed shoulder with the largest negative deviation from the nominal diameter.

Segments with intermediate diameters can be provided if the exposed shoulder portion's diameter tolerance range is broad enough such that the largest diameter segments will be too large for exposed shoulders of intermediate diameters and the smallest diameter segment will be stretched beyond its acceptable retention stretch limit when installed on exposed shoulders of intermediate diameter.

While one form of the invention has been shown and described, other forms will now be apparent to those skilled in the art. Therefore, it will be understood that the embodiment shown in the drawings and described is merely for illustrative purposes and is not intended to limit the scope of the invention which is defined by the claims which follow.

TABLE I

BREAKING AND PULLING FORCES REQUIRED TO REMOVE VARIOUS BOOTS
(pounds)

| Valve Guide Shoulder/ Retaining Boot* | .555-Inch Diameter Steel Shoulder | .562-Inch Diameter Steel Shoulder | .569-Inch Diameter Steel Shoulder | .562-Inch Diameter Cast Shoulder | .564-Inch Diameter Cast Shoulder |
|---|---|---|---|---|---|
| .555-Inch Diameter Boot - No Step | 128 9 | 101 0 | 103 0 | 128 0 | 135 0 |
| .553- + .559- Inch Diameter Two Step Boot | 130 108 | 172 102 | 88 0 | 245 154 | 247 149 |
| .553-Inch Diameter Fold Boot No Step | 300 175 | 198 91 | 100 54 | 314 163 | 194 100 |
| .554-Inch Diameter Boot - No Step | 213 73 | 137 0 | 105 0 | 194 45 | 160 0 |
| .543-Inch Diameter Boot - No Step | 58 53 | 55 50 | 83 44 | 88 80 | 69 56 |
| Three Step Boot - Diameters .552, .560 and .567 Inches | 123 96 | 158 135 | 146 96 | 170 146 | 136 173 |

*All boot diameter sizes are within ±.001-inch.

The embodiments of the invention in which an exclusive property or privilege is claimed are defined as follows:

1. In a valve seal assembly for preventing excessive quantities of oil from leaking between valve guides and valve stems in an internal combustion engine, said valve seal assembly having a valve seal and a boot for retaining said valve seal around a valve stem immediately above the valve guide, said boot telescopically engaging valve guide exposed shoulders having diameters ranging from a maximum positive deviation from a nominal diameter to a maximum negative deviation from a nominal diameter, said boot having a tubular base the diameter of which has an acceptable retention stretch limit, the improvement comprising:

a boot having a tubular base including at least two contiguous segments of progressively narrowing diameters, the largest of said segments being closest to the valve seal, the smallest of said segments being furthest from said valve seal, wherein said largest diameter segment can accommodate within its acceptable retention stretch limit an exposed shoulder with the largest positive deviaton from a nominal diameter, wherein said smallest diameter segment can accommodate within its acceptable retention stretch limit an exposed shoulder with the largest negative deviation from a nominal diameter, and wherein segments of intermediate diameters, if any, can accommodate within their acceptable retention stretch limits an exposed shoulder with a diameter intermediate the maximum positive and negative deviations from nominal diameters.

2. A valve seal assembly of claim 1 wherein said segments have a maximum retention stretch limit and said smallest diameter segment can accommodate within its maximum retention stretch limit an exposed shoulder with the maximum negative deviation from a nominal diameter and wherein said largest diameter segment can accommodate within its maximum retention stretch limit an exposed shoulder with the maximum positive deviation from a nominal diameter.

3. A valve seal assembly of claim 2 wherein said boot has two segments.

4. A valve seal assembly of claim 2 wherein said boot has three segments.

5. A valve seal assembly of claim 2 wherein said boot is made from drawing quality steel.

6. A valve seal assembly of claim 3 wherein said boot is made from drawing quality steel.

7. A valve seal assembly of claim 4 wherein said boot is made from drawing quality steel.

* * * * *